US009639152B2

(12) United States Patent
Locker et al.

(10) Patent No.: US 9,639,152 B2
(45) Date of Patent: May 2, 2017

(54) DISPLAY ALIGNMENT BASED ON EYE TRACKING

(71) Applicant: LENOVO (Singapore) PTE, LTD., New Tech Park (SG)

(72) Inventors: Howard Locker, Cary, NC (US); Michaela Rose Case, Raleigh, NC (US); John Weldon Nicholson, Cary, NC (US); Aaron Michael Stewart, Raleigh, NC (US)

(73) Assignee: Lenovo (Singapore) PTE. LTD., Tech Park (SG)

( * ) Notice: Subject to any disclaimer, the term of this patent is extended or adjusted under 35 U.S.C. 154(b) by 208 days.

(21) Appl. No.: 14/144,148

(22) Filed: Dec. 30, 2013

(65) Prior Publication Data

US 2015/0185832 A1 Jul. 2, 2015

(51) Int. Cl.
*G06F 3/01* (2006.01)
*G06F 3/0484* (2013.01)
*G06K 9/00* (2006.01)

(52) U.S. Cl.
CPC .......... *G06F 3/013* (2013.01); *G06F 3/04842* (2013.01); *G06F 3/04845* (2013.01); *G06K 9/00604* (2013.01)

(58) Field of Classification Search
USPC ............... 715/234, 810, 764, 781, 835, 839; 345/55, 156
See application file for complete search history.

(56) References Cited

U.S. PATENT DOCUMENTS 6,456,262 B1 * 9/2002 Bell ........................ A61B 3/113 345/472
8,947,382 B2 * 2/2015 Winkler .............. H04M 1/0233 345/156
8,970,455 B2 * 3/2015 Thorson .................. G06F 3/147 345/105
2002/0067366 A1 * 6/2002 Hirao ..................... B60K 35/00 345/660
2005/0047629 A1 * 3/2005 Farrell .................... G06F 3/013 382/117
2010/0001926 A1 * 1/2010 Amirparviz .......... A61B 5/1455 345/7
2010/0007601 A1 * 1/2010 Lashina .................. G06F 3/013 345/156
2011/0001762 A1 * 1/2011 Li ...................... G06K 9/00604 345/649
2011/0006978 A1 * 1/2011 Yuan ....................... G06F 3/013 345/156
2013/0076787 A1 * 3/2013 Mathieu .................... B60R 1/00 345/633
2014/0055846 A1 * 2/2014 Wheeler ................ A61B 3/113 359/350
2014/0092142 A1 * 4/2014 Boelter .................... G09G 5/00 345/672

(Continued)

*Primary Examiner* — Doon Chow
*Assistant Examiner* — Wendy Nicholas
(74) *Attorney, Agent, or Firm* — Kunzler Law Group

(57) ABSTRACT

For display alignment based on eye tracking, a method is disclosed that includes displaying, by use of a processor, a graphical object on a display screen, detecting an aspect of a user relative to the display screen, and moving the graphical object to reduce a viewing angle between the graphical object and the aspect of a user.

16 Claims, 14 Drawing Sheets

1200
1242
1220
1226
1202
1222
1228
1260
1244
1224
1220a
1272
1244
1270
1252

(56) References Cited

U.S. PATENT DOCUMENTS

2014/0118255 A1* 5/2014 Billerbeck .............. G06F 3/017 345/158
2014/0168056 A1* 6/2014 Swaminathan .... G06K 9/00604 345/156
2014/0191948 A1* 7/2014 Kim ..................... H04N 5/4403 345/156
2014/0347262 A1* 11/2014 Paek ........................ G09G 3/20 345/156
2015/0220144 A1* 8/2015 Ashbrook .......... G02B 27/0093 345/156

* cited by examiner

DISPLAY ALIGNMENT BASED ON EYE TRACKING

FIELD

The subject matter disclosed herein relates to using displaying graphical objects and more particularly relates to the display alignment based on eye tracking.

BACKGROUND

Description of the Related Art

Electronic displays permeate almost every facet of current society. Computers, laptops, tablets, cell phones, medical devices, appliances, other devices, or the like, typically include some kind of electronic display.

As the efficiency and value of electronic displays continue to rise, it is expected that the prevalence of electronic displays will continue. Current electronic display solutions typically display information, or graphical objects at a fixed location. Therefore, a user typically must move, or move a display, in order to view the display information at an optimal viewing angle.

In one example, a watch may include a display. In this example, a user must typically move the watch, or adjust his/herself in order to move the display of the watch into a line of sight. Also, the user must typically rotate his/her arm in order to view a display of the watch at an optimal viewing angle.

BRIEF SUMMARY

An apparatus for display alignment based on eye tracking is disclosed. A method and computer program product also perform the functions of the apparatus.

In one embodiment, an apparatus includes a display screen. In another embodiment, the apparatus includes a processor in communication with the display screen. In a further embodiment, the apparatus includes a display module that presents a graphical object on the display screen. In one embodiment, the apparatus includes a user module that determines an aspect of a user relative to the display screen. In another embodiment, the apparatus includes an alignment module that moves the graphical object to reduce a viewing angle between the graphical object and the aspect of a user.

In one embodiment, the aspect of a user comprises a location of a user and the alignment module moves the graphical object to reduce a viewing angle between the graphical object and the user. In another embodiment, the aspect of a user comprises a user's eyes and wherein the user module selects the graphical object from a plurality of graphical objects based on the graphical object being disposed at a location where the user's eyes are directed.

In one embodiment, the user module is further configured to use facial recognition to identify the user. In another embodiment, the display screen wraps around a portion of an object. In a further embodiment, the display screen includes wide angle cameras at degree intervals around the screen. In one embodiment, the user module uses the wide angle cameras to determine the location of the user's eyes.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
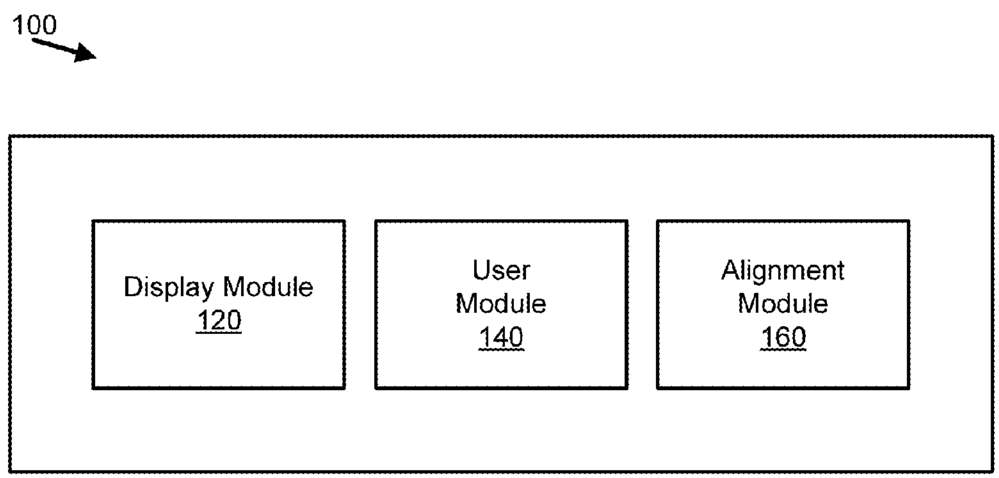
FIG. 1 is a schematic block diagram illustrating one embodiment of an apparatus for display alignment based on eye tracking.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine readable code and/or software for execution by various types of processors. An identified module of machine readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of machine readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices, and may exist, at least partially, merely as electronic signals on a system or network. Where a module or portions of a module are implemented in software, the software portions are stored on one or more computer readable storage devices.

Any combination of one or more computer readable medium may be utilized. The computer readable medium may be a machine readable signal medium or a storage device. The computer readable medium may be a storage device storing the machine readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A machine readable signal medium may include a propagated data signal with machine readable code embodied therein, for example, in baseband or as part of a carrier wave. Such a propagated signal may take any of a variety of forms, including, but not limited to, electro-magnetic, optical, or any suitable combination thereof. A machine readable signal medium may be any storage device that is not a computer readable storage medium and that can communicate, propagate, or transport a program for use by or in connection with an instruction execution system, apparatus, or device. Machine readable code embodied on a storage device may be transmitted using any appropriate medium, including but not limited to wireless, wireline, optical fiber cable, Radio Frequency (RF), etc., or any suitable combination of the foregoing.

Machine readable code for carrying out operations for embodiments may be written in any combination of one or more programming languages, including an object oriented programming language such as Java, Smalltalk, C++ or the like and conventional procedural programming languages, such as the "C" programming language or similar programming languages. The machine readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by machine readable code. These machine readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The machine readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The machine readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and machine readable code. Descriptions of Figures may refer to elements described in previous Figures, like numbers referring to like elements.

In order to address the current state of the art, the present application discloses several embodiments of a method, and apparatus for display alignment based on eye tracking. FIG. 1 is a schematic block diagram illustrating one embodiment of an apparatus 100 for display alignment based on eye tracking. In one embodiment, the apparatus includes a display module 120, a user module 140, and an alignment module 160.

In one embodiment, the apparatus 100, may include the display module 120 module configured to present one or more graphical objects at a display screen. In one embodiment, the display module 120 may be configured to depict one or more graphical objects at a screen of a computing device. The graphical object may include any graphical depiction, arrangement of shapes, colors, letters, figures, lines, or the like. A graphical object may also include handwritten text, typed text, or any other information capable of being displayed via a screen of a computing device. In one example, a graphical object may be a depiction of a handwritten word. In another example, a graphical object may be a portion of an object in a photograph. In another example, a graphical object may include a sentence, or other sequence of words or characters. In another example, a graphical object may include a set of objects that share some commonality in color, texture, location, or the like. Therefore, in certain embodiments, a graphical object may include many graphical objects.

The display module 120, in certain embodiments, may arrange many graphical objects so that they do not obscure each other from view by a user of the display screen. In other embodiment, the display module 120 may present graphical objects in other arrangements, such as, but not limited to, graphical objects behind other graphical objects, graphical objects above or below, other graphical objects. As one skilled in the art may appreciate, a wide variety of graphical objects may be displayed on an electronic display, and this disclosure is meant to incorporate all such displays.

As the present disclosure does not claim any specific type of display screen technology, a display screen, as described herein, may include a wide variety of different display technologies, such as, but not limited to, active matrix, AMOLED, cathode ray tube, chromadots, crystal light emitting diode, digital light processing, electronics on plastic by laser release (EPLaR), Ferro Liquid Display, flexible display, Glasstron, holographic, Indiglo, interferometric modulator display, laser, laser powered phosphor, liquid crystal, light emitting diode, liquid crystal on silicon, MicroTiles, organic light emitting diode, phased array optics, plasma, projection, quantum dot display, scotophor, spatial light modulation, super twisted nematic display, surface-conduction electron-emitter display, thin film transistor, nanomaterials, grapheme, 3D glass, or similar, or other, or to be developed display, or the like. As the present disclosure may be implemented using any display technology, this disclosure is not limited in this regard.

In one embodiment, the apparatus 100 may include the user module 140 configured to determine an aspect of a user relative to the display screen. In one embodiment, the aspect of the user may be a location of the user relative to the display screen. In another embodiment, the aspect of the user may be the user's eyes. In one embodiment, the user module may select a graphical object from many graphical objects displayed via the display module 120. In one example, the display module 120 may display many windows, applications, images, or the like.

The user module may select one of the graphical objects based on the graphical object being disposed at a location where the user's eyes are directed. For example, the display module 120 may display four different applications executing. In response to a user directing eyes at the first of the four applications, the user module 140 may select the first application.

In one example, the user module 140 may configured a camera, and may process data from the camera to determine a location of a user's eyes. In another example, the user module 140 many cameras and may combine data from the cameras to determine a location of a user's eyes. In another example, the user module 140 may determine a location for a user, and assume a position of the user's eyes based on a location of the user's body. In another example, the user module 140 may use one or more eye tracking algorithms to determine a location of the user's eyes based on locating the user's body and/or head.

In one embodiment, the display screen may wrap around a portion of an object and the user module 140 may use one or more wide angle cameras at degree intervals around the display screen. In one example, the user module 140 may include four wide angle cameras at degree locations of 0, 90 degrees, 180 degrees, and 270 degrees. In another example, the user module 140 may include three wide angle cameras at degree locations of 0 degrees, 120 degrees, and 240 degrees. Therefore, regardless of the location of a user's eyes around the object, at least one of the wide angle cameras may locate the user and/or the user's eyes. Of course, one skilled in the art may recognize other locations around an object in order to determine a location of a user and/or a user's eyes. Therefore, this disclosure is not limited to specific degree intervals or specific numbers of cameras.

In another embodiment, the user module 140 may use a motion sensor to determine a location of the user's eyes. In one example, the user module 140 may user passive or active infrared sensors. In another example, the user module 140 may use other optical systems, such as, but not limited to, video cameras, or other camera systems, or the like. In another example, the user module 140 may use Radio Frequency Energy (e.g. radar, microwave and tomographic motion detection) to detect a motion of the user and/or the user's eyes. In another example, the user module 140 may use sound to determine a location of a user and/or a user's eyes. For example, the user module 140 may use microphones and/or acoustic sensors to determine a location of the user and/or the user's eyes.

In another embodiment, the user module 140 may detect motion of the apparatus 100 based on vibration. In one example, the user module 140 may include triboelectric, seismic, and/or inertia-switch sensors to determine motion of the apparatus, and the user module 140 may update a relative position of a user and/or a user's eyes based on motion of the apparatus. In another example, the user module 140 may include a gyroscope for determining motion of the apparatus.

In another embodiment, the user module 140 may detect motion of the apparatus 100 based on magnetism. In one example, the user module 140 may include magnetic sensors and/or magnetometers to determine motion of the apparatus, and the user module 140 may update a relative position of a user and/or a user's eyes based on motion of the apparatus 100.

In another embodiment, the user module 140 may include an infrared sensor. In infrared sensor may indicate a position or location of a person close to the sensor, and the user module 140 may consider data from an infrared sensor to determine a location of a user and/or a user's eyes. In one embodiment, the user module 140 may include a mechanical switch to determine a position of a user and/or a user's eyes. For example, a series of mechanical switches may be included at a floor in front of a display screen. As a user stands in front of the display screen, the user may step on one or more of the mechanical switches. Therefore, the user module 140 may determine a location of a user and/or a user's eyes based, at least in part, on one or more mechanical switches. One skilled in the art may recognize other ways to determine a location of a user's eyes relative to the screen, and this disclosure is meant to include all such ways.

In one embodiment, the apparatus 100 may include the alignment module 160 configured to move one or more of the graphical objects on the display screen to reduce a viewing angle between the graphical objects and the user's eyes. In one example, moving the graphical object may include moving the graphical object to a portion of the display screen that is closer to the user and/or the user's eyes.

In one embodiment, a viewing line may be determined between the graphical object and the user's eyes. Also, the user module 140 may determine a tangent line at a nearest surface (a nearest surface to the user) of the display screen, and determine a perpendicular line between that surface and the user. In one embodiment, the viewing angle may be measured between the viewing line and the perpendicular line.

In one example, the graphical object may initially be at a viewing angle of 32 degrees (from the line perpendicular to the tangent line of the display surface to the viewing line between the user and the graphical object), and the alignment module 160 may move the graphical object toward a portion of the display screen that is spatially closer to the user and/or the user's eyes. This may decrease the viewing angle between the line perpendicular to the tangent line of the display surface to 15 degrees or less.

In another embodiment, the alignment module 160 may move other graphical objects to not interfere with the graphical object being moved towards the user and/or the user's eyes. In one example, a graphical object 'A' may be located at a location on the display screen that is closest to the user. The alignment module 160 may move the graphical object 'A' further away from the user in order to make room for the graphical object being moved closer to the user to reduce a viewing angle between the graphical object and the user's eyes.

In another embodiment, the alignment module 160 may display the graphical object being moved over another graphical object at the location. For example, a graphical object 'A' may be located closest to a user's eyes. The alignment module 160 may move a graphical object 'B' to the location of graphical object 'A' and display graphical object 'B' over the top of graphical object 'A'. This may cause graphical object 'A' to no longer be visible to the user, but this is not necessarily the case.

Figure 2:
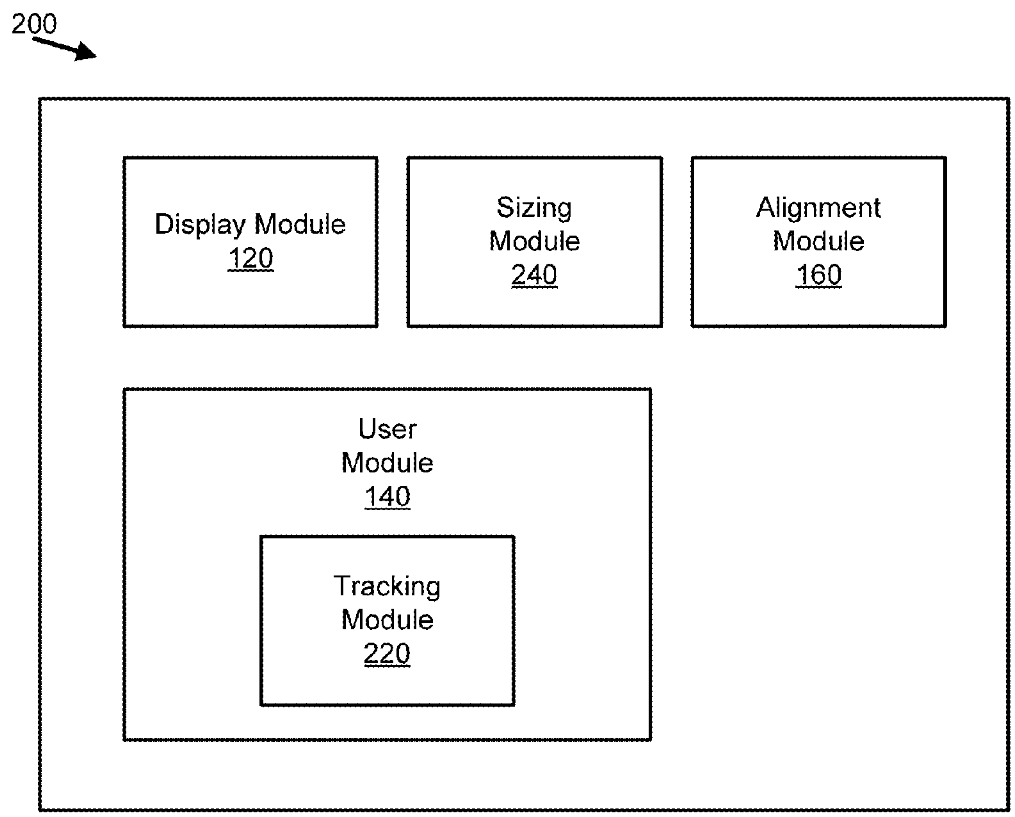
FIG. 2 is another schematic block diagram illustrating one embodiment of an apparatus for display alignment based on eye tracking.

FIG. 2 is another schematic block diagram illustrating one embodiment of an apparatus for display alignment based on eye tracking. In one embodiment, the apparatus includes the display module 120, the user module 140, the alignment module 160, a tracking module 220, and a sizing module 240. The display module 120, the user module 140, and the alignment module 160 may or may not be substantially similar to modules depicted in FIG. 1.

In one embodiment, the user module 140 may include a tracking module 220 configured to track a location on the screen where a user's eyes are directed. The tracking module 220 may use any available or to be developed eye tracking techniques or technologies, or the like. In one example, a user may be fitted with a specialized contact lenses with an embedded minor or magnetic field sensor. This may allow the tracking module 220 to measure a movement of the user's eyes. In one embodiment, the tracking module 220 may measure a movement of a user's eyes optically. For example, a video camera, or other optical sensor, may sense light reflected from the one of the user's eyes. The tracking module 220 may measure changes in reflections from the eyes. The tracking module 220 may track corneal reflections or a center of a pupil over time. In another example, the tracking module 220 may track one or more features of a user's eyes to determine where a user's eyes are directed. Features of an eye may include blood vessels, other physical features, or the like.

The tracking module 220 may determine a location on the screen where a user's eyes are directed based, at least in part, on measured movements of the user's eyes. In another embodiment, the alignment module 160 may be further configured to determine a graphical object at the location where the user's eyes are directed. In one embodiment, the alignment module 160 may move the graphical object at the location to another location that is spatially closer to the user's eyes. The alignment module 160 may determine a point on the screen that is closest to the user's eyes as previously described, and may move the graphical object to the point on the screen. Moving the graphical object in this manner may reduce the viewing angle between the graphical object and the user.

In another embodiment, the apparatus 200 may include the sizing module 240 configured to increase a size of the graphical object. The sizing module 240 may increase a size of a graphical object being moved by the alignment module 160. This may allow the user to more easily view the graphical object, or may allow the user to more easily view certain features or portions of the graphical object.

In another embodiment, the sizing module 240 may decrease a size of graphical object being moved away from the user to make room for the graphical object being moved toward the user by the alignment module 160. In another embodiment, the sizing module 240 may decrease respective sizes of other graphical objects being displayed by the display module 120 to make the graphical object being moved towards the user more prominent.

Figure 3:
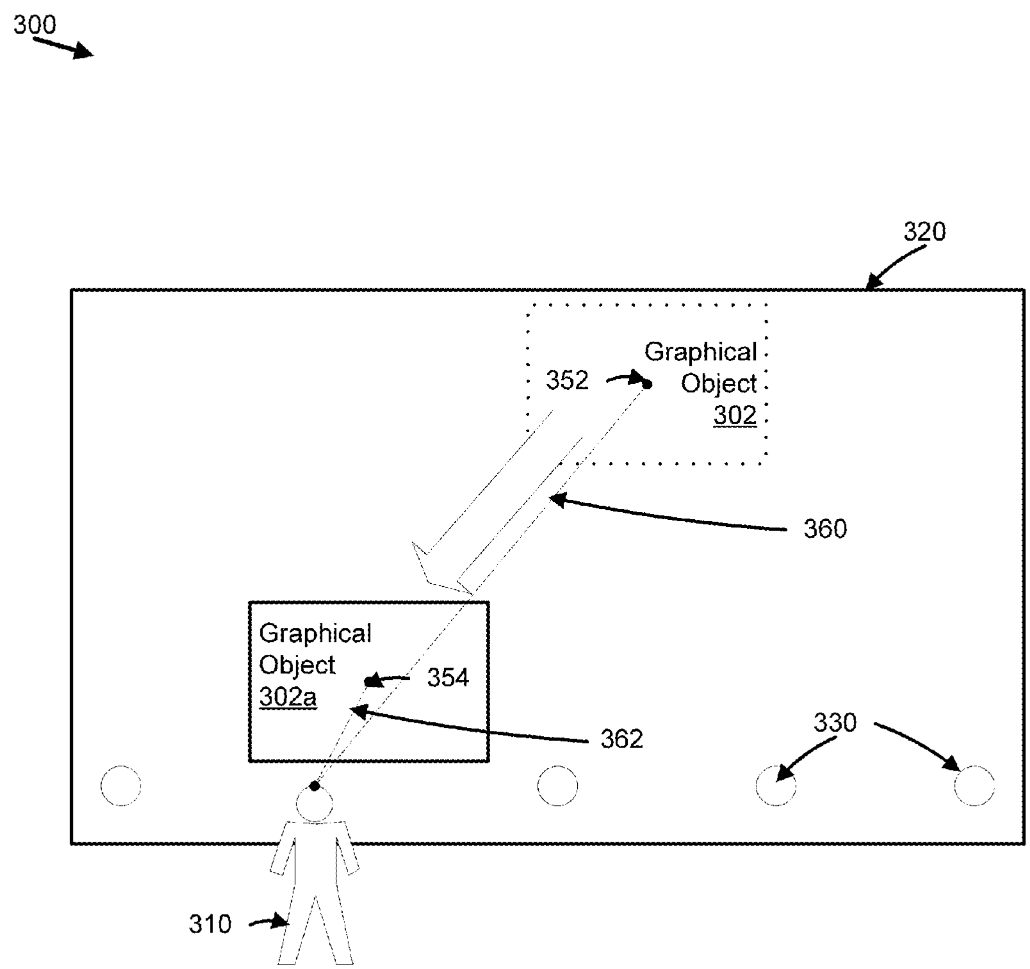
FIG. 3 is an illustration depicting one embodiment of an apparatus for display alignment based on eye tracking.

FIG. 3 is an illustration depicting one embodiment of an apparatus 300 for display alignment based on eye tracking. In one embodiment, a display screen 320 may display a graphical object 302 at location 352. The apparatus 300 may include the user module 140 configured to determine a location of a user 310 relative to the display screen 320. The user module, in certain embodiments, may include one or more cameras 330.

In one example, the alignment module 160 may determine a viewing line 360 between the user 310 and the graphical object 302 based on a location 352 of the graphical object 302 and a location of the user 310. The alignment module 160 may determine another viewing line 362 based on a location of the user 310 and a location 354 on the display screen 320 that is closer to the user 310. The alignment module 160 may determine a viewing angle based on a degree difference between the viewing line 360 and the viewing line 362. In one example, the alignment module 160 may move the graphical object 302 at location 352 to location 354. The display module 120 may display the graphical object 302 at location 354 (depicted as Graphical Object 302*a*).

In another embodiment, the user 310 may move away from the display screen 320 such that the user module 140 can no longer determine a location of the user 310. In one example, the alignment module 160 may move the graphical object 302*a* at location 354 back to a previous location 352. The sizing module 240 may reduce the size of the graphical object 302*a* back to a previous size based on the alignment module 160 moving the graphical object back to a previous location 354.

Figure 4:
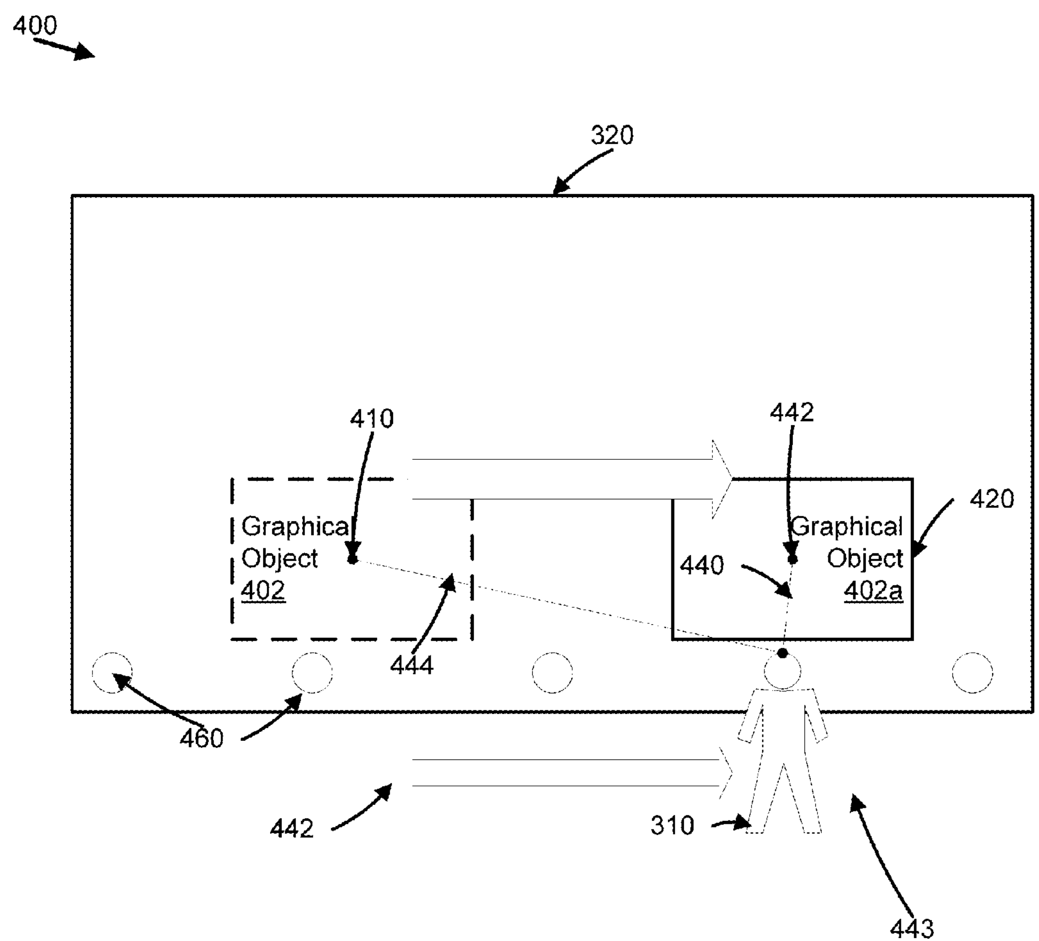
FIG. 4 is another illustration illustrating one embodiment of an apparatus for display alignment based on eye tracking.

FIG. 4 is another illustration illustrating one embodiment of an apparatus 400 for display alignment based on eye tracking. In one embodiment, a display screen 320 may display a graphical object 402 at location 410. The apparatus 400 may include the user module 140 configured to determine a location of a user 310 relative to the display screen 320. The user module 140, in certain embodiments, may include one or more cameras 460.

In one example, a user 310 may move from one location 442 to another location 443. The user module 140 may determine a location of the user and/or the user's eyes based, at least in part, on movement by the user 310. Movement by the user 310 may be determined by one or more cameras 460. A user moving from one location 442 to another location 443 may change a viewing line 444 between a graphical object 402 and the user 310. In one example, the alignment module 160 may move the graphical object 402 at location 410 to location 442. Moving the graphical object 402 from location 410 to location 442 may reduce a viewing angle 440 for the user. The display module 120 may display the graphical object 402 at location 442 (depicted as Graphical Object 402*a*). The graphical object 402*a* may or may not be substantially similar to the graphical object 402. In one example, the graphical object 402*a* may be different size than the graphical object 402.

Figure 5:
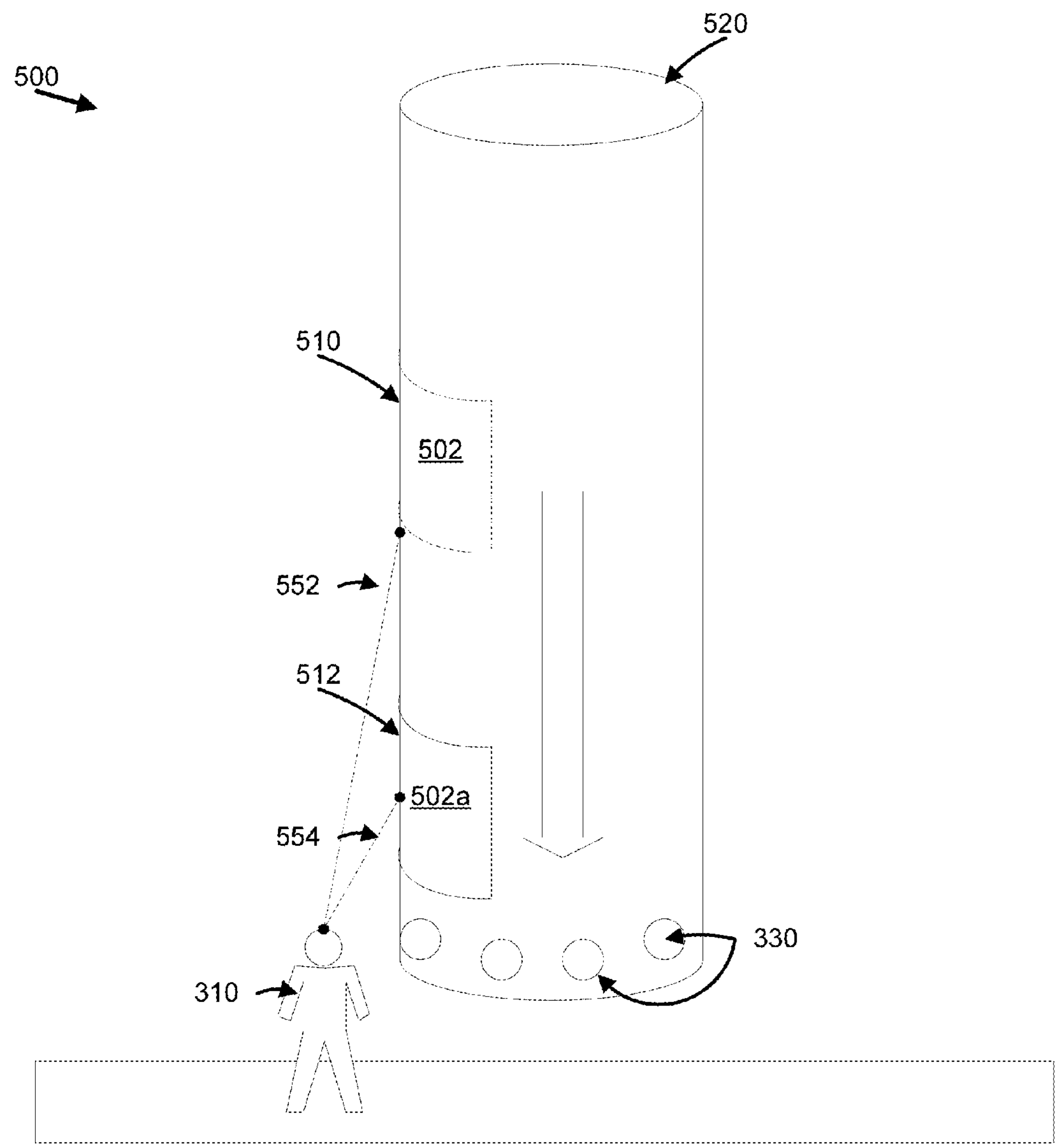
FIG. 5 is an illustration depicting one embodiment of a display screen for display alignment based on eye tracking.

FIG. 5 is an illustration depicting one embodiment 500 of a display screen 520 for display alignment based on eye tracking. In one embodiment, the display screen 520 may wrap around a portion of an object. In another embodiment, the display screen may include one or more cameras 330 at degree intervals around the screen. In one embodiment, the user module 140 may use the cameras 330 to determine a location of a user 310 and/or the user's eyes. In one embodiment, a user may be located at any degree angle (i.e. a degree angle between 0 and 360 degrees) from the screen 520, and the user module 140 may determine the location of the user, based on the user being within a field of view of one of the cameras 330.

In one example, the alignment module 160 may determine a viewing line 552 between the user 310 and the graphical object 502 based on a location 510 of the graphical object 502 and a location of the user 310. The alignment module 160 may determine another viewing line 554 based on a location of the user 310 and a location 512 on the display screen 520 that is closer to the user 310. The alignment module 160 may determine a viewing angle of viewing line 554 to be less than the viewing angle of the viewing line 552. In one example, the alignment module 160 may move the graphical object 502 at location 510 to location 512 to reduce the viewing angle of the graphical object 502. The display module 120 may display the graphical object 502 at location 512 (depicted as Graphical Object 502a).

Figure 6:
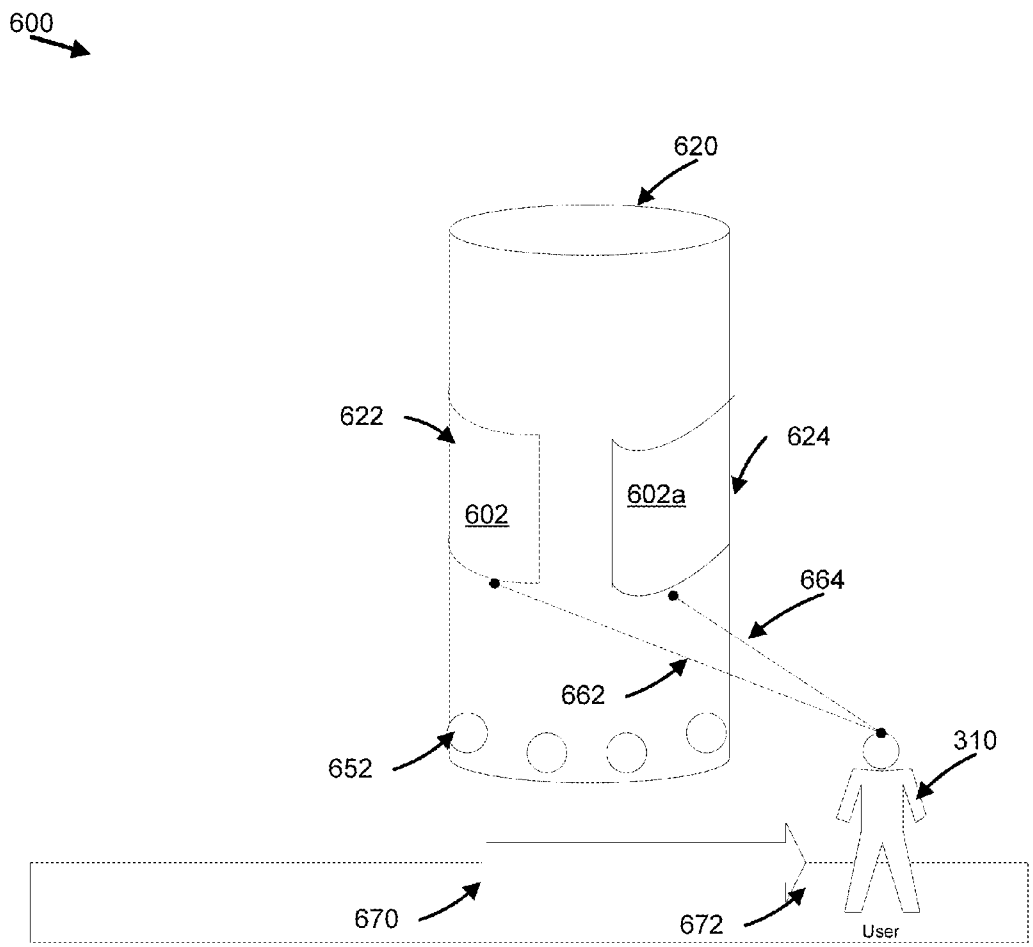
FIG. 6 is another illustration depicting one embodiment of a display screen for display alignment based on eye tracking.

FIG. 6 is another illustration depicting one embodiment 600 of a display screen 620 for display alignment based on eye tracking. In one embodiment, a display screen 620 may display a graphical object 602 at location 622. The apparatus 600 may include the user module 140 configured to determine a location of a user 310 relative to the display screen 620. The user module, in certain embodiments, may include one or more cameras 652.

In one example, a user 310 may move from one location 670 to another location 672. The user module 140 may determine a location of the user and/or the user's eyes based, at least in part, on movement by the user 310. Movement by the user 310 may be determined by one or more cameras 652. A user moving from one location 670 to another location 672 may change a viewing line 662 between a graphical object 602 and the user 310. In one example, the alignment module 160 may move the graphical object 602 at location 622 to location 624. Moving the graphical object 602 from location 622 to location 624 may reduce a viewing angle 664 for the user. The display module 120 may display the graphical object 602 at location 624 (depicted as Graphical Object 602*a*). The graphical object 602*a* may or may not be substantially similar to the graphical object 602. In one example, the graphical object 602*a* may be different size than the graphical object 402.

Figure 7:
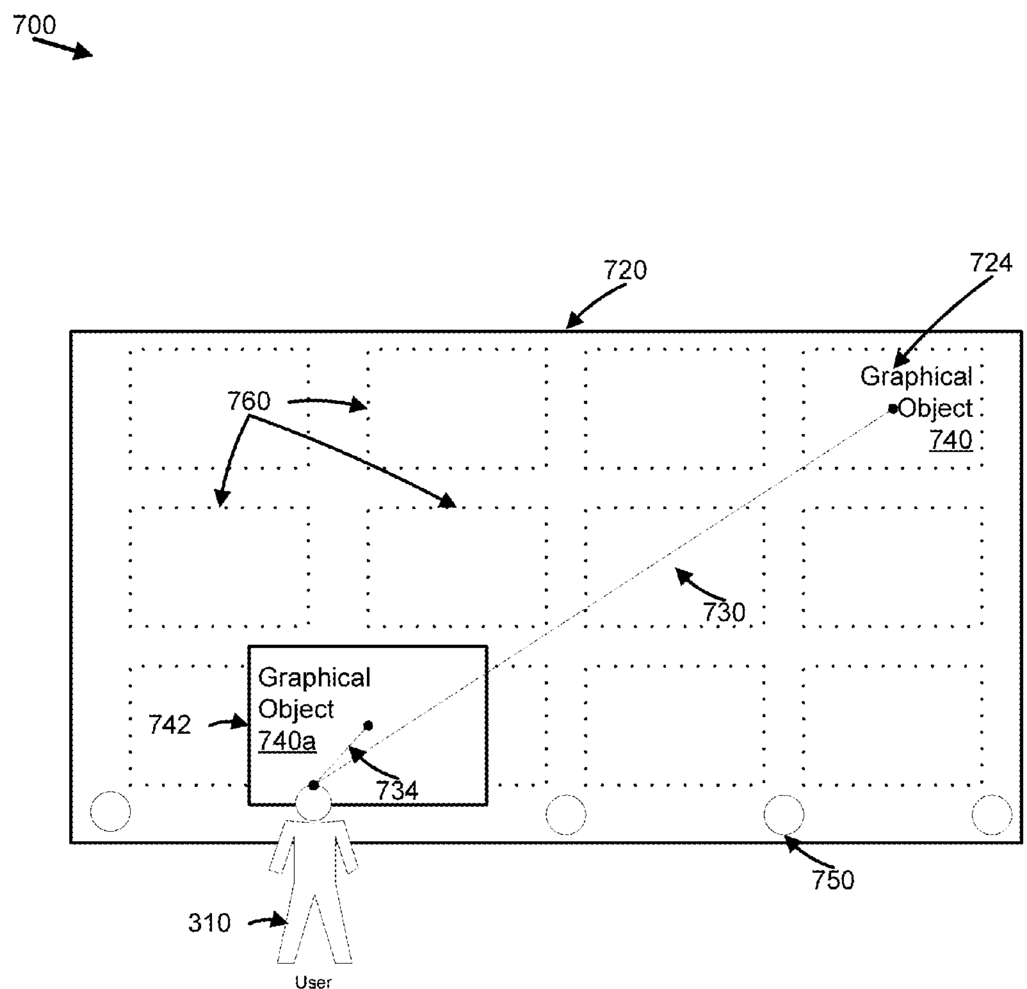
FIG. 7 is another illustration depicting one embodiment of a display for display alignment based on eye tracking.

FIG. 7 is another illustration depicting one embodiment 700 of a display for display alignment based on eye tracking. The display module 120 may display a graphical object 740 at location 724 as previously described. The display module 120 may display many other graphical objects 760 on the display screen 720. In one examples, the graphical objects may be displayed in an array, but this is not necessarily the case as the display module 120 may display graphical objects 760 in any arrangement, organization, or the like.

The tracking module 220 may track a location 724 on the screen where a user's eyes are directed. The tracking module 220 may wait a period of time before acknowledging the focus of the user's eyes. For example, a user may glance at a graphical object and may focus on the graphical object for less than 200 milliseconds. In this example, the tracking module 220 may not determine that the user is focused on the graphical object. In another example, the user may focus on the graphical object for more than 500 milliseconds, and the tracking module 220 may determine that the user is focused on the location. The tracking module 220 may use one or more cameras 750 located around the display screen 720 to determine the location.

The alignment module 160 may determine that the graphical object 740 is also at the location 724 and may move the graphical object 740 to a location 742 that reduces a user's viewing angle 734 to the graphical object **740*a*. Therefore, a viewing angle based on a viewing line 734 may be less than a viewing angle based on a previous viewing line 730 to the graphical object 740 from the user 310**.

Figure 8:
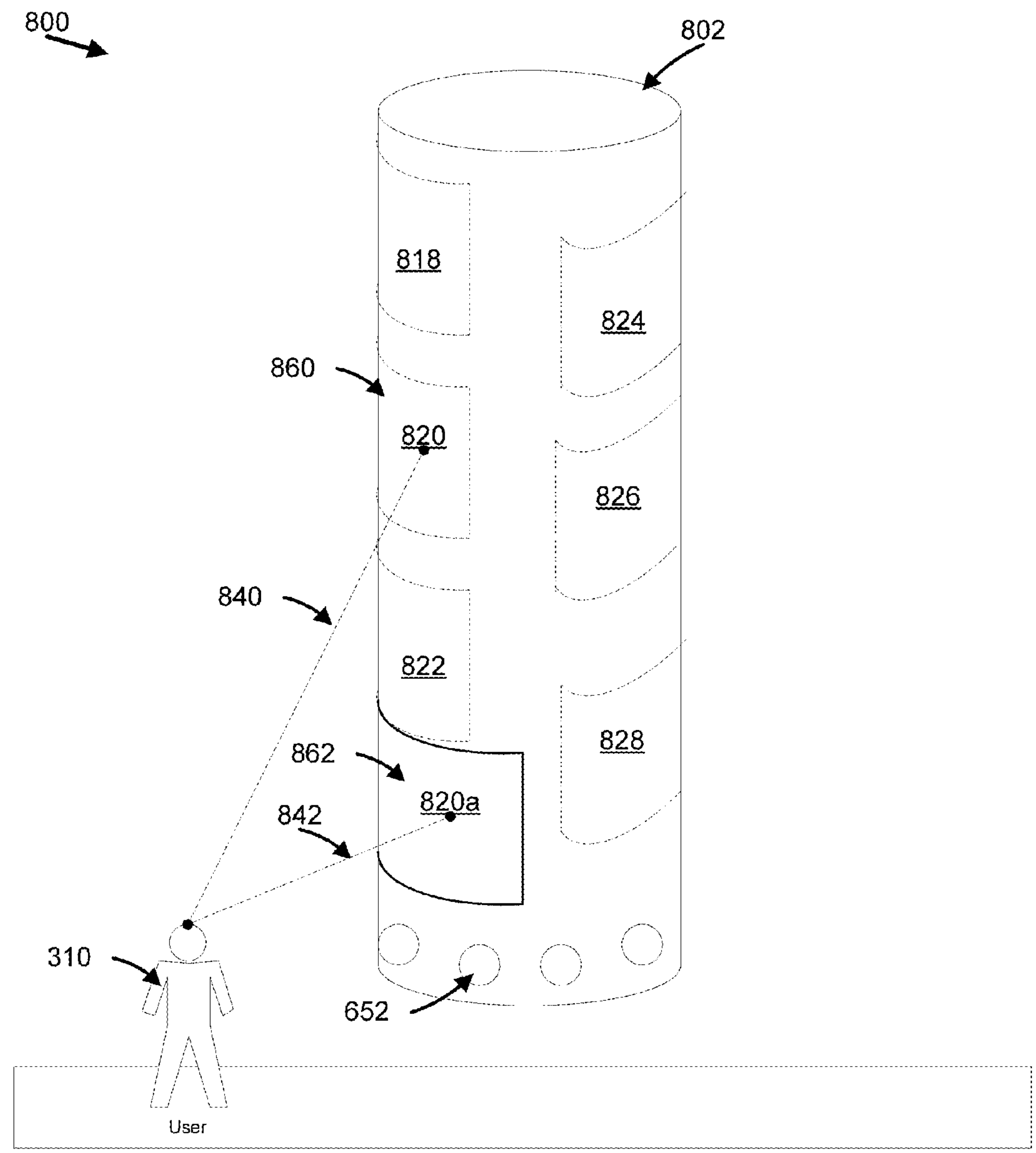
FIG. 8 is another illustration depicting one embodiment of a display for display alignment based on eye tracking.

FIG. 8 is another illustration depicting one embodiment 800 of a display 802 for display alignment based on eye tracking. The display 802 may partially wrap around another object. The display module 120 may display a graphical object 820 at location 860 as previously described. The display module 120 may display many other graphical objects 818, 822, 824, 826, 828 on the display screen 802. In one examples, the graphical objects may be displayed in an array around an object, but this is not necessarily the case as the display module 120 may display graphical objects 818,822,824,826,828 in any arrangement, organization, or the like.

The tracking module 220 may track a location 860 on the screen where a user's eyes are directed. The tracking module 220 may use one or more cameras 652 located around the display screen 802 to determine the location. The alignment module 160 may determine that the graphical object 820 is also at the location 860 and may move the graphical object 820 to a location 862 that reduces a user's viewing angle 840 to a lower viewing angle 842.

Figure 9:
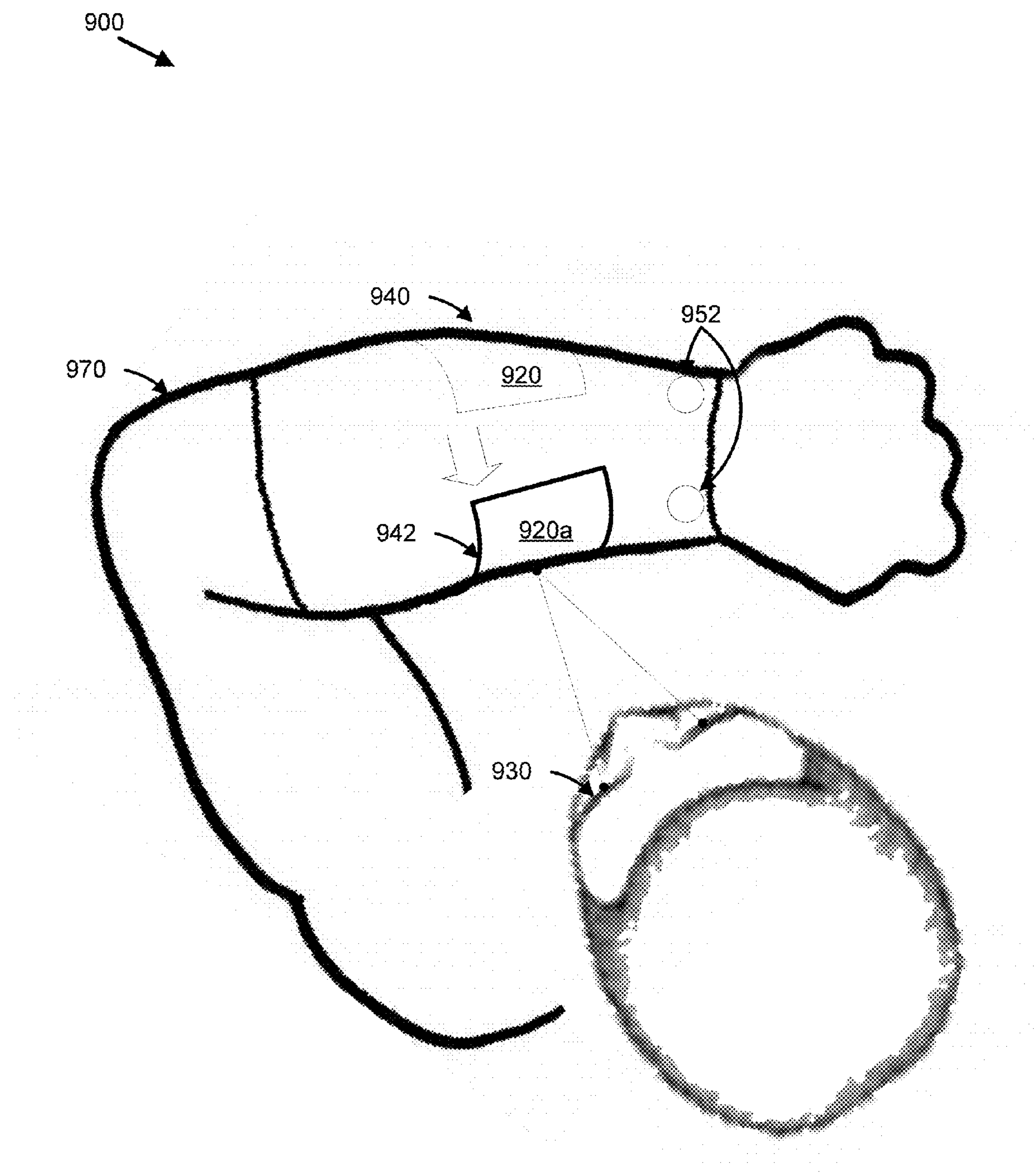
FIG. 9 is another illustration depicting one embodiment of a display on a forearm for display alignment based on eye tracking.

FIG. 9 is another illustration depicting one embodiment 900 of a flexible display 940 on a forearm 970 of a user for display alignment based on eye tracking. In one embodiment, the flexible display 940 may wrap around a portion of a forearm 970. In another embodiment, the display screen may include one or more cameras 952 at degree intervals around the forearm. In one embodiment, the user module 140 may use the cameras 952 to determine a location of a user and/or the user's eyes. In one embodiment, a user's eyes 930 may be located at any degree angle (i.e. a degree angle between 0 and 360 degrees) around the forearm 970, and the user module 140 may determine the location of the user's eyes 930, based on the eyes 930 being within a field of view of one of the cameras 952.

In one example, the alignment module 160 may move a graphical object 920 to a location 942 (displayed as graphical object 920a) on a portion of the screen 940 that is closer to the user's eyes 930. This may reduce a viewing angle between the graphical object **920*a* and the viewer's eyes 930**.

In another embodiment, the user module 140 may also track a motion of the user's forearm 970 and maintain a relative location of the user's eyes 930 based on the motion of the display screen 940. The user module 140 may track the motion of the display screen 940 and may update the relative location of the user's eyes based on periodic input from one or more of the cameras 952. For example, the user module 140 may update a relative location of the user's eyes at regular intervals, such as, 4 times per second, or faster, or slower.

In another embodiment, the user module 140 may be configured to use facial recognition to identify the user from other persons. Therefore, in a scenario where the user may be in proximity to other persons, there may be many persons in view of one or more of the cameras 952. The user module 140, based on input from one or more of the cameras 952, may determine which face is the face of the user. The user module 140 may then update the location of the user's eyes 930 based on the location of the user's face.

In one example, the user module 140 may identify facial features by extracting landmarks, or features, from an image of a person. The user module 140 may analyze the relative position, size, and/or shape of the eyes, nose, cheekbones, and jaw. The user module 140 may compare identified features of a face to a database of facial features to determine if the person being viewed is the correct person. In another embodiment, the user module 140 may use three dimensional facial recognition. By incorporating many light sensors, the user module 140 may construct a three dimensional representation of a face being viewed, and may compare the face with a database of faces to determine if the person being viewed is the correct user. Of course, this disclosure, is not limited in this regard and may use any currently known, currently unknown, or to be developed facial recognition technologies.

Figure 10:
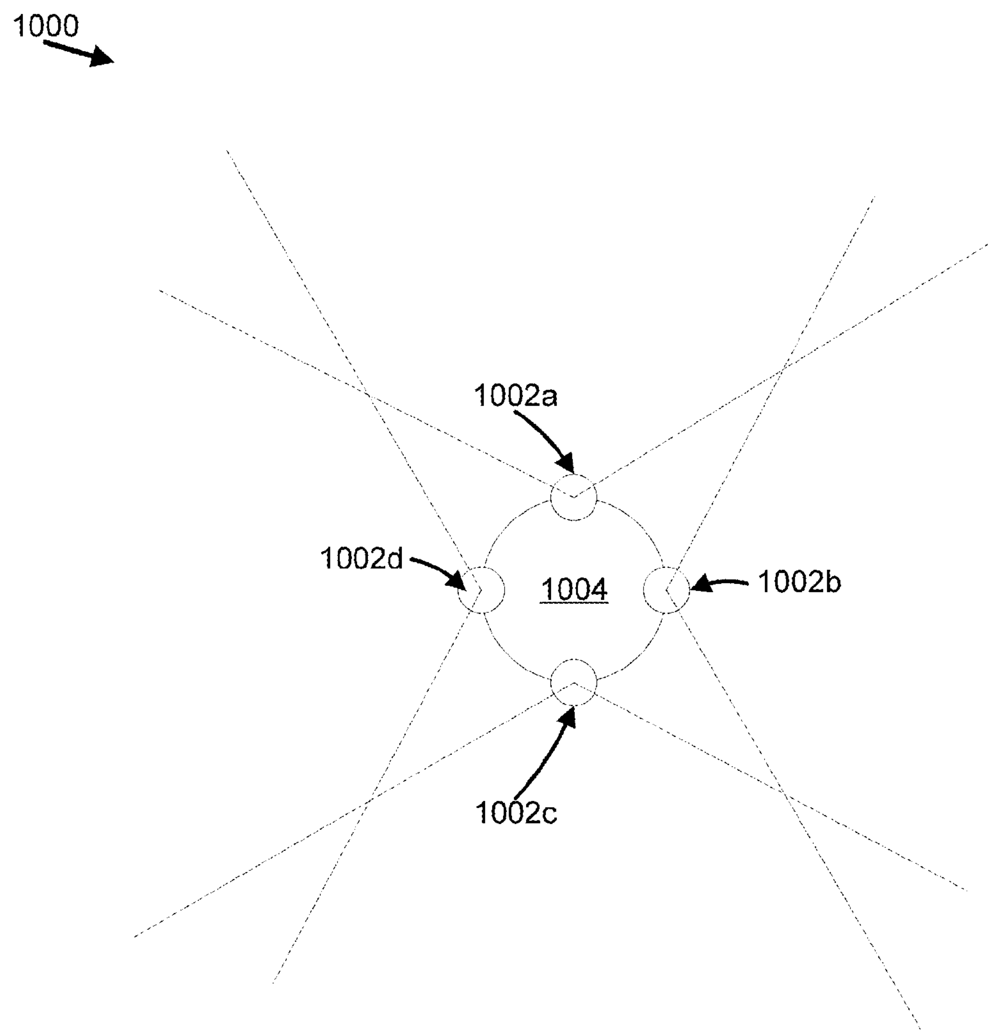
FIG. 10 is another illustration depicting one embodiment of an arrangement of wide angle cameras for display alignment based on eye tracking.

FIG. 10 is another illustration depicting one embodiment of an arrangement of wide angle cameras for display alignment based on eye tracking. In this embodiment, four wide angle cameras may be used to track a location of a user and/or a user's eyes. In one example, the user module 140 may include four wide angle cameras 1002 placed at 90 degree intervals around the object 1004. The display module 120 may include a flexible display that wraps around a portion of the object 1004. Of course, the display need not necessarily wrap all the way around.

Other embodiments include, three cameras at 120 degree intervals, 6 cameras at 60 degree intervals, 10 cameras at 36 degree intervals, or other, or the like. In certain embodiments, an odd number of cameras may be used, and the cameras may not be placed at regular intervals around the object 1004. Of course, this disclosure is not limited in this regard as any number of cameras may be used and may be placed at any degree locations around an object to facilitate tracking the location of the user and/or the user's eyes. For example, where a flexible display is placed on a forearm of a user, more cameras may be placed at an upper portion of the display and less cameras may be placed on a lower portion of the display. This may facilitate more accurate tracking where a user and/or a user's eyes are more likely to be located.

Figure 11:
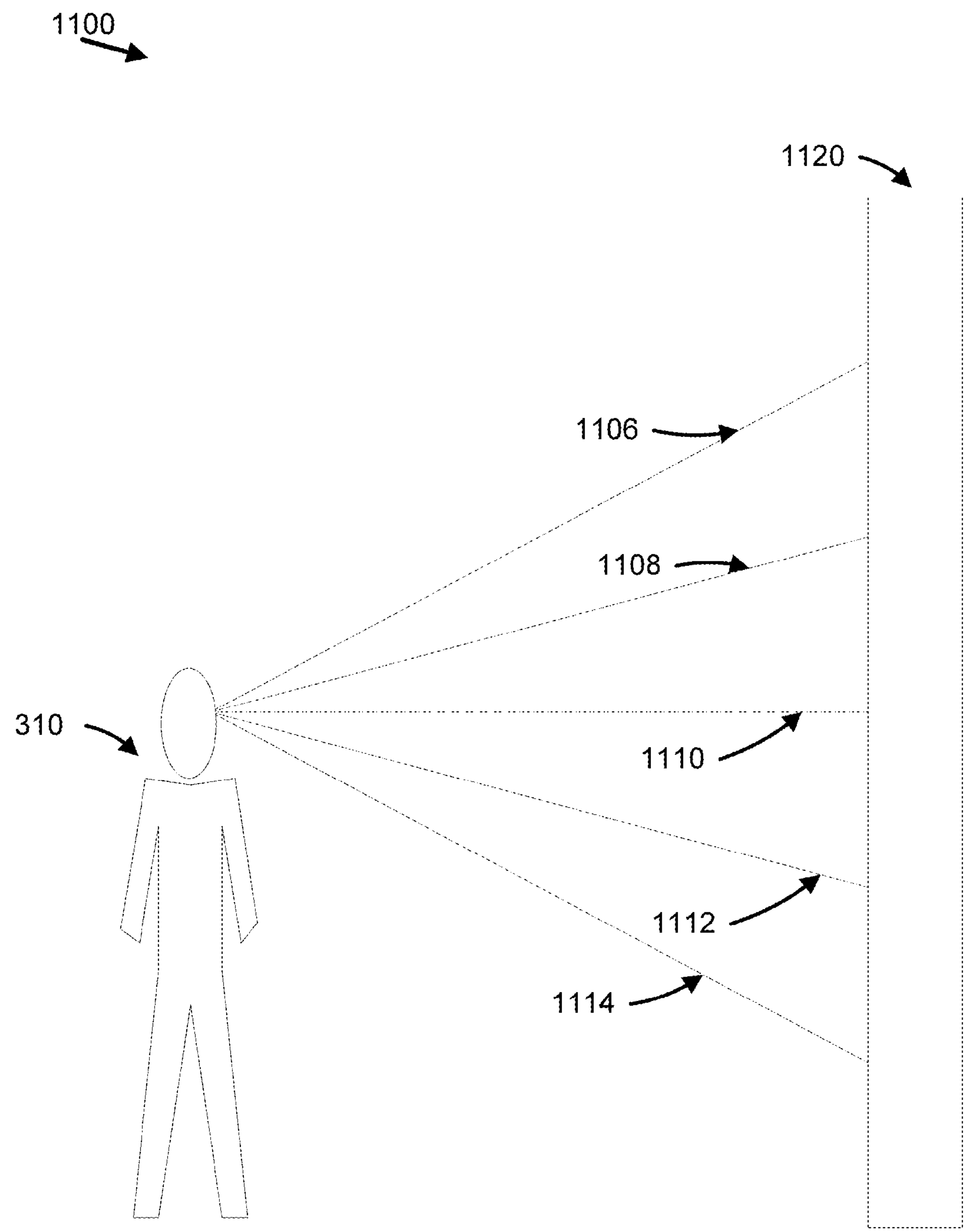
FIG. 11 is another illustration depicting varying viewing angles from a display surface in accordance with one embodiment.

FIG. 11 is another illustration depicting varying viewing angles from a display surface 1120 in accordance with one embodiment 1100. In one embodiment, the alignment module 160 may determine a viewing angle between viewing angle threshold values 1106, 1108,1110,1112,1114. For example, a viewing angle 1110 may be 0 degrees. A viewing angle 1108 may be 15 degrees. A viewing angle 1112 may be −15 degrees (negative 15). A viewing angle 1106 may be 30 degrees. A viewing angle 1114 may be −30 (negative 30) degrees. Of course, other viewing angle threshold values may be used and this disclosure is not limited in this regard.

The alignment module 160 may determine that a viewing angle between the user and a graphical object exceeds viewing angle 1106. The alignment module 160 may move the graphical object to a viewing angle of between viewing angle 1108 and viewing angle 1112. Therefore, in one example, the alignment module 160 may move the graphical object so that a viewing angle between the user 310 and the graphical object is between negative 15 (−15) degrees and positive 15 (+15) degrees.

In other embodiments, the display module 120 may display additional graphical objects at higher viewing angles, such as, viewing angle 1106 or viewing angle 1114 while a user may be viewing a graphical object at viewing angle 1110. For example, a user may be viewing a graphical object at viewing angle 1110, which may be 0 degrees. The display module 120 may display another graphical object at a viewing angle of 20 degrees 1106 or higher. This may alert the user to a new graphical object but may not necessarily interrupt a user's view of the graphical object being focused on.

In another embodiment, the alignment module 160 my define various ranges of viewing angles and may prioritize the display of graphical objects based on region. For example, one range may be between viewing angle 1106 and viewing angle 1108. Another range may be between viewing angle 1108 and viewing angle 1110. The alignment module 160 may move graphical objects to different viewing ranges based on importance, priority, size, color, or the like. For example, the user may receive a text message. The alignment module 160 may display a notification of the text message in a viewing range between viewing angle 1108 and viewing angle 1110. The alignment module 160 may display the actual text of the text message between viewing angle 1108 and viewing angle 1106.

Figure 12:
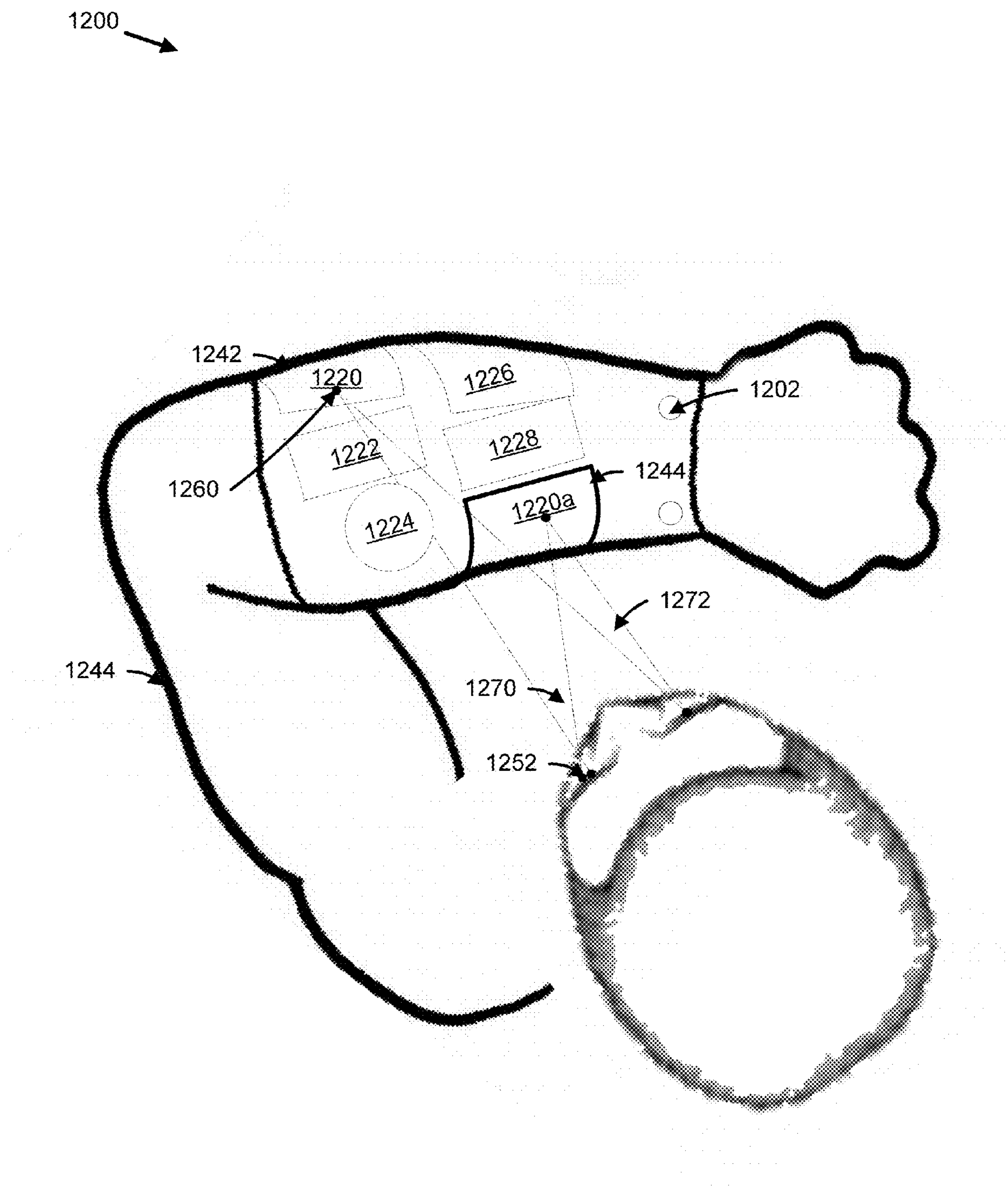
FIG. 12 is another illustration depicting one embodiment of a display on a forearm for display alignment based on eye tracking.

FIG. 12 is another illustration depicting one embodiment 1200 of a display 1242 on a forearm 1244 of a user for display alignment based on eye 652 tracking. The display 1242 may partially wrap around a user's forearm 1244. The display module 120 may display graphical objects 1220, 1222, 1224, 1226, 1228 on the display 1242 in varying locations. The graphical objects may be displayed in a wide variety of different locations, sizes, or orientations.

The tracking module 220 may track a location 1260 on the screen where a user's eyes 1252 are directed. The tracking module 220 may use one or more cameras 1202 located around the display screen 1242 to determine the location 1260. The alignment module 160 may determine that the graphical object 1220 is also at the location 1260 and may move the graphical object 1220 to a location 1244 that reduces a user's viewing angle 1270 to a lower viewing angle 1272.

In other embodiments, the alignment module 160 may move other graphical objects 1222,1224,1226,1228 further away from the user and/or the user's eyes 1252 to increase a viewing angle between the user and these graphical objects 1222,1224,1226,1228. This may provide additional space for the display module 120 to display the graphical object **1220*a* moved toward to user and/or the user's eyes 1252. In certain embodiment, the sizing module 240 may increase a size of the graphical object 1220*a* to facilitate easy viewing by the user as previously described. The sizing module 240 may also decrease respective sizes of other graphical objects 1222,1224,1226,1228 to further highlight the graphical object the user may be focusing on 1220*a*. In other embodiments, the display module 120 may display additional graphical objects in other locations while the user is viewing the graphical object 1220*a***.

Figure 13:
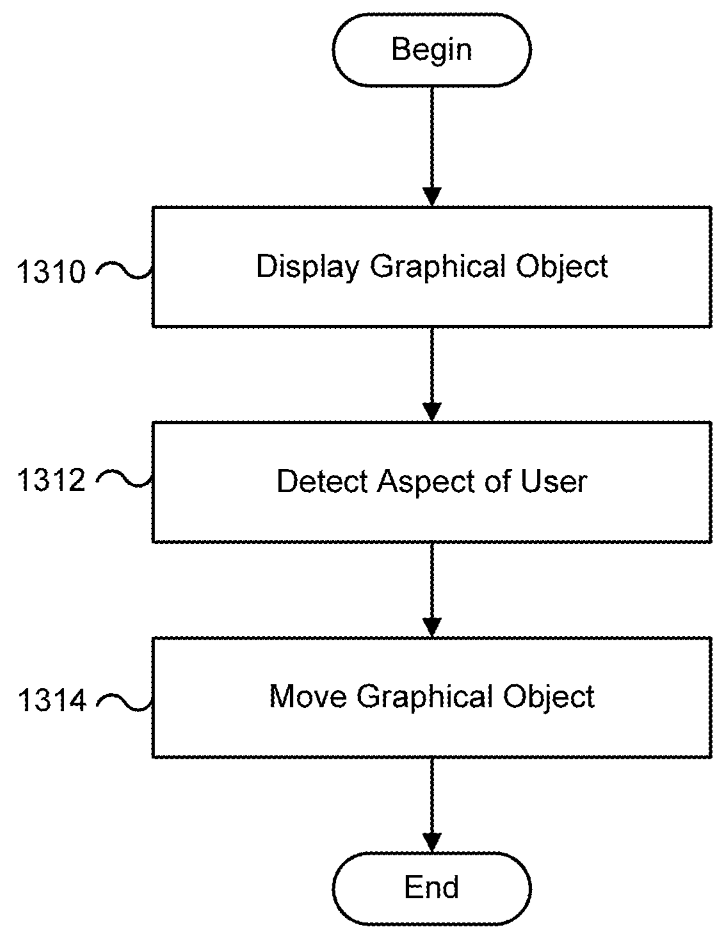
FIG. 13 is schematic flow chart diagram illustrating one embodiment of a method for display alignment based on eye tracking.

FIG. 13 is schematic flow chart diagram illustrating one embodiment of a method 1300 for display alignment based on eye tracking. In one embodiment, the method 1300 may begin and the display module 120 may display 1310 one or more graphical objects on a display screen. The user module 140 may detect 1312 an aspect of a user. The alignment module 160 may move one or more of the graphical objects to reduce a viewing angle between the graphical objects and the user's eyes, and the method may end.

Figure 14:
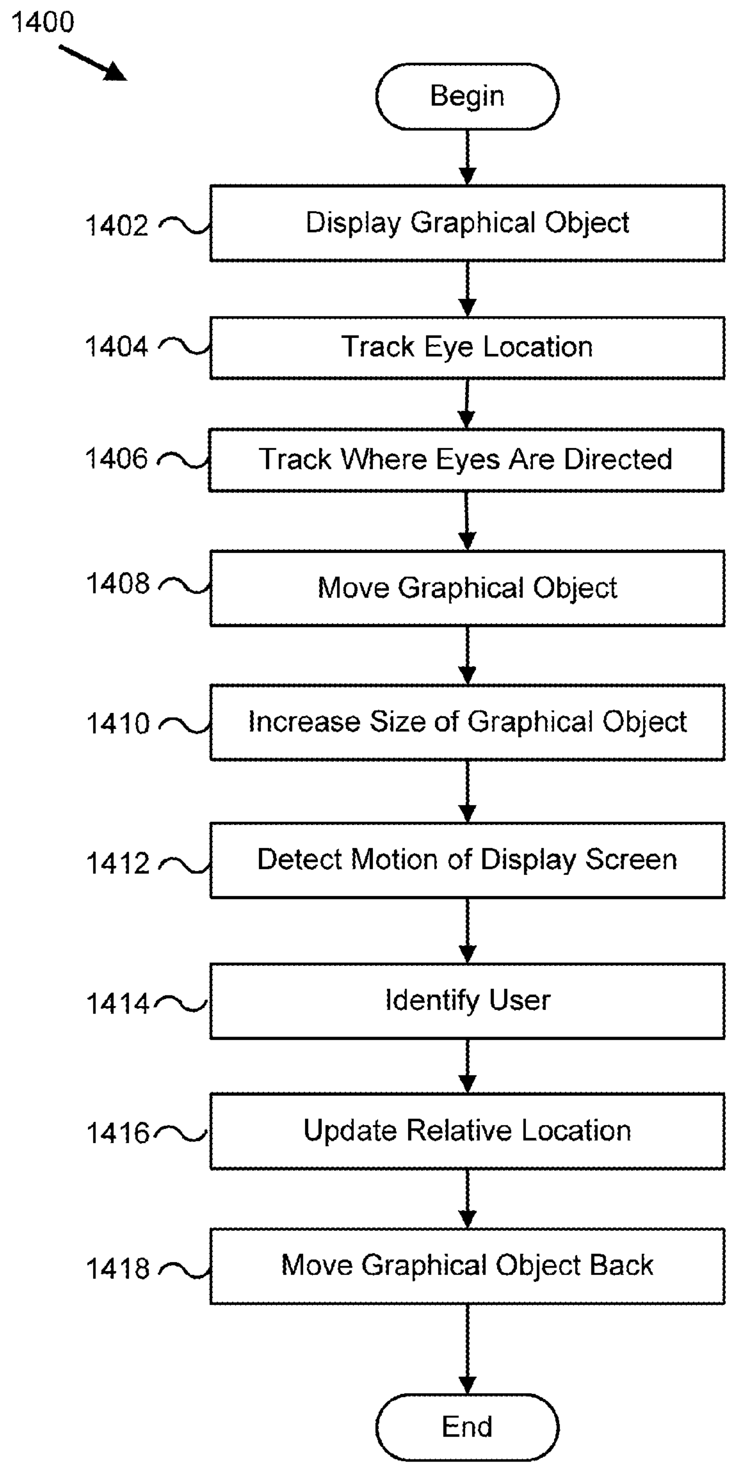
FIG. 14 is another schematic flow chart diagram illustrating one embodiment of a method for display alignment based on eye tracking.

FIG. 14 is another schematic flow chart diagram illustrating one embodiment of a method 1400 for display alignment based on eye tracking. In one embodiment, the method 1400 may begin and the display module 120 may display 1402 one or more graphical objects. The user module 140 may track 1404 a location of a user's eyes. The user module 140 may track 1406 where a user's eyes are directed. The alignment module 160 may move a graphical object to decrease a viewing angle between the user and the graphical object. The sizing module 240 may increase 1410 a size of the graphical object being moved by the alignment module 160. The user module 140 may detect 1412 motion of the display screen. The user module 140 may identify 1414 a user. The user module 140 may update 1416 a relative location of the user and/or the user's eyes. The alignment module 160 may move 1418 a graphical object back to an initial location in response to the user focusing on a different location on the display screen and the method may end.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:

a display screen;

a processor in communication with the display screen;

a display module configured to present a first graphical object and a second graphical object on the display screen;

a user module configured to:

detect an aspect of a user relative to the display screen, wherein the aspect of the user comprises the user's eyes;

select the first graphical obiect from a plurality of graphical obiects based on the first graphical object being disposed at a location where the user's eyes are directed; and determine when the user's eyes focus on a different location on the display screen; and an alignment module configured to:

determine that a viewing angle between the user's eves and the first object exceeds a threshold value;

in response to the determination, move the first graphical object to reduce the viewing angle between the first graphical object and the user's eyes and move the second graphical object away from the first graphical object to increase the viewing angle between the second graphical object and the user's eyes and to provide additional space for displaying the first graphical object, wherein the viewing angle comprises an angle formed between a viewing line and a shortest line between the user's eyes and the display screen, and the viewing line is a line between a gaze of the user's eyes and the display screen; and in response to determining that the user's eves focus on a different location on the display screen, move the graphical obiects back to their initial locations.

2. The apparatus of claim 1, further comprising a sizing module that increases a size of the first graphical object.

3. The apparatus of claim 1, the user module further tracks motion of the display screen to determine a relative location of the user.

4. The apparatus of claim 1, the user module further comprising facial recognition to identify the user.

5. The apparatus of claim 1, wherein the display screen wraps around a portion of an object, the display screen including a plurality of wide angle cameras disposed at intervals around the display screen, the user module monitors the wide angle cameras to determine the relative location of the user.

6. The apparatus of claim 1, wherein the alignment module reduces the size of the second graphical object.

7. A method comprising:

displaying, by use of a processor, a first graphical object and a second graphical object on a display screen;

detecting an aspect of a user relative to the display screen, wherein the aspect of the user comprises the user's eyes;

selecting the first graphical object from a plurality of graphical obiects based on the first graphical object being disposed at a location where the user's eyes are directed;

determining, by use of a processor, that a viewing angle between the user's eyes and the first object exceeds a threshold value;

in response to the determination, moving, by use of a processor, the first graphical object to reduce a viewing angle between the first graphical object and the user's eyes and moving the second graphical object away from the first graphical object to increase the viewing angle between the second graphical object and the user's eyes and to provide additional space for displaying the first graphical object wherein the viewing angle comprises an angle formed between a viewing line and a shortest line between the user's eyes and the display screen, and the viewing line is a line between a gaze of the user's eyes and the display screen; and in response to determining that the user's eyes focus on a different location on the display screen, moving, by use of a processor, the graphical obiects back to their initial locations.

8. The method of claim 7, wherein detecting an aspect of a user comprises detecting a relative location of the user.

9. The method of claim 7, further comprising increasing a size of the first graphical object.

10. The method of claim 7, wherein the viewing angle is reduced to less than 15 degrees.

11. The method of claim 8, further comprising detecting motion of the display screen and updating the relative location of the user based on the detected motion.

12. The method of claim 7, further comprising identifying the user by recognizing characteristics of the user's face.

13. The method of claim 7, wherein the display screen wraps around an object allowing a user to view a portion of the display screen at an angle between 0 and 360 degrees from the object.

14. The method of claim 13, wherein the display screen includes a plurality of wide angle cameras disposed at intervals around the display screen.

15. A program product comprising a non-transitory computer readable storage medium that stores code executable by a processor to perform:

displaying a first graphical object and a second graphical object on a display screen;

detecting an aspect of a user relative to the display screen, wherein the aspect of the user comprises the user's eyes;

selecting the first graphical object from a plurality of graphical objects based on the first graphical object being disposed at a location where the user's eyes are directed;

determining that a viewing angle between the user's eyes and the first object exceeds a threshold value;

in response to the determination, moving the first graphical object to reduce a viewing angle between the first graphical object and the user's eyes and moving the second graphical object away from the first graphical object to increase the viewing angle between the second graphical object and the user's eyes and to provide additional space for displaying the first graphical object wherein the viewing angle comprises an angle formed between a viewing line and a shortest line between the user's eyes and the display screen, and the viewing line is a line between a gaze of the user's eyes and the display screen, and the viewing angle is reduced in direct response to a change in the gaze of the user's eyes; and in response to determining that the user's eyes focus on a different location on the display screen, moving the graphical obiects back to their initial locations.

16. The computer program product of claim 15, wherein the aspect of a user comprises a relative location of a user.

* * * * *